Oct. 8, 1940.　　　　E. KLARFELD　　　　2,216,883
OUTLET BOX
Filed Aug. 13, 1938
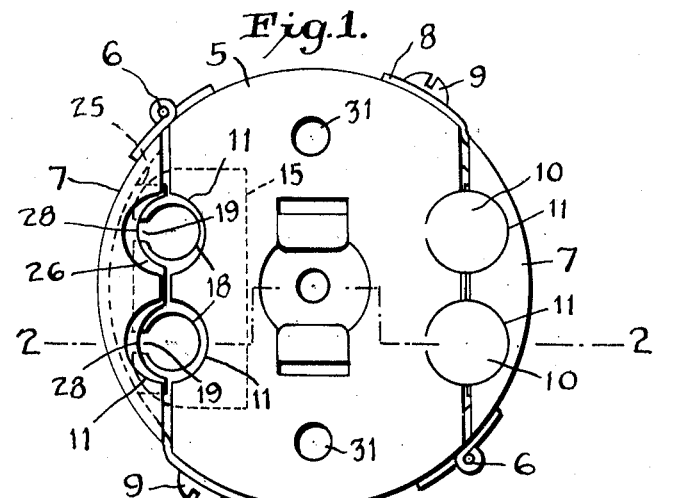
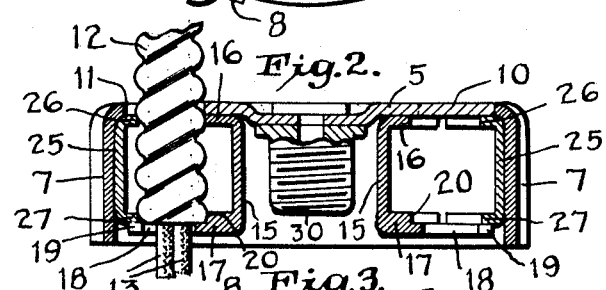
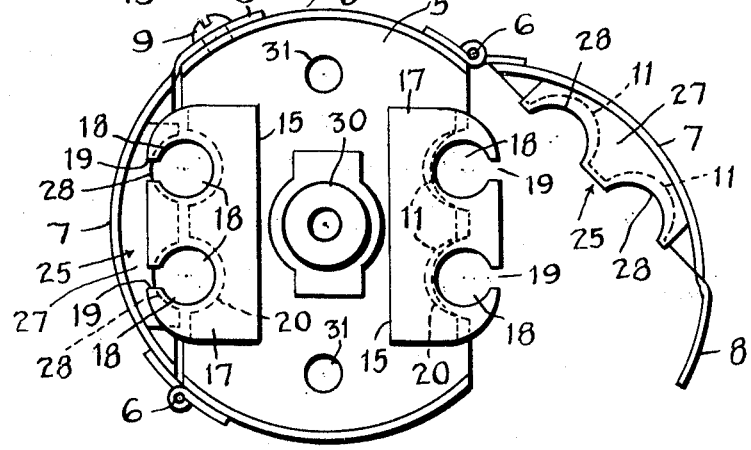
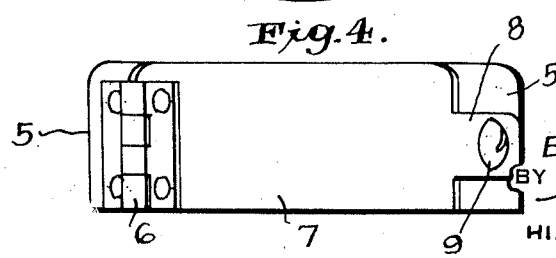
INVENTOR
*Edward Klarfeld*
BY *Geo. A. Senior*
HIS ATTORNEY Patented Oct. 8, 1940

2,216,883

UNITED STATES PATENT OFFICE 2,216,883

OUTLET BOX

Edward Klarfeld, Newark, N. J., assignor to Crown Construction Corp., Newark, N. J., a corporation of New Jersey Application August 13, 1938, Serial No. 224,687

2 Claims. (Cl. 220—3.2)

The invention relates to outlet boxes used in electric wiring systems.

It is common practice to enclose the wires of an electric wiring circuit within an armoring cable and this cable leads into an outlet box or receptacle. The wires within the armoring cable are connected at the outlet box to the wires of an electric fixture. In the outlet boxes most commonly used a clamping member is loosely mounted within the box and it is necessary to thread the armored cable and wires through the box and the clamping member after which the clamping member is tightened by a screw which may be more or less inaccessible. This threading through and tightening operation is very troublesome and takes considerable time.

The principal object of the present invention is to provide an outlet box in which the armored cables and the wires may be easily and rapidly positioned in the box with a minimum amount of effort and in which the armored cable is firmly and rigidly secured in the box.

Other objects and advantages will become apparent as this specification proceeds. Referring to the drawing forming a part thereof and in which one embodiment of the invention is illustrated:

Fig. 1 is a top plan view;

Fig. 2 is a vertical sectional view taken on line 2—2 of Fig. 1;

Fig. 3 is a bottom plan view with one of the hinged segmental portions of the outlet box swung away from the body portion; and Fig. 4 is a side elevation.

Referring again to said drawing the body portion of the outlet box is designated by the reference numeral 5. The body portion 5 has hinged thereto at 6—6 segmental portions 7—7. The segmental portions are provided with tongues or extensions 8 formed integral with or suitably secured thereto and screws 9 passing through apertures in the tongues 8 are threaded into the body portion and firmly hold the segmental portions in their closed positions. Numerous other types of fastening means might be utilized for holding the segmental portions in their closed positions. It is also desired to call attention to the fact that while the outlet box as illustrated is shown as being round the invention is applicable to boxes of any desired shape.

The outlet box is provided with the usual knock-outs 10 which cover openings 11, one-half of the openings being formed in the segmental portions 7 and the other half in the body portion, the necks of the knock-outs being formed integral with the body portion. In Figs. 1 and 2 the knock-outs in the left hand side have been removed to permit of the positioning of the armored cables and those in the right hand side have not been removed.

The body portion and each of the hinged segmental portions carry co-operating clamping members. An armored cable 12 is shown in the left hand side of Fig. 2 as entered and secured between the co-operating clamping members. The usual wires 13 are shown extending from the armored cable.

The clamping members 15 of the body portion of the outlet box are approximately channel-shaped in cross-section. The upper legs 16 are welded or otherwise secured to the body portion and the lower legs 17 are extended so as to provide platforms upon which the ends of the sheaths of the armored cables rest. The platforms are provided with apertures 18 through which the wires 13 pass. To facilitate the entrance of the wires 13 the apertures 18 have openings 19. Semi-circular ledges 20 are formed on the platforms 17, the purpose of which will hereinafter become apparent.

The clamping members 25 on the segmental portions are also channel-shaped in cross-section and their upper and lower legs 26 and 27 are substantially identical in shape. The edges of the legs 26 and 27 are provided with semi-circular openings 28 for embracing the armored cables. The clamping members 25 are welded or otherwise secured to the segmental portions 7.

Secured to the top wall of the outlet box is a fixture-stud 30 for supporting an electric fixture, or the like, and suitable openings 31 are provided for securing means to position the outlet box. The stud 30 and openings 31 form no part of the present invention.

In using the outlet box one or more knock-outs 10 are removed, depending upon how many armored cables are to be used and the segmental portion 7 is swung away from the body portion 5, as indicated in Fig. 3. Obviously the segmental portion would probably be swung to a considerably greater degree than illustrated in the figure. The armored cable is then positioned in that part of the opening 11 in the body portion of the outlet box, the end of the sheath resting on the platform 27 and against the ledge 20. In practice a ferrule is often inserted in the end of the sheath to compensate for irregularities made when the sheath is trimmed to expose the wires. The wires 13 are simultaneously passed through the openings 19 so as to extend through the aperture 18. The segmental portion is then closed and the armored cable is positively and securely held in the outlet box by the co-operating clamping members 15 and 25 engaging it. The low legs 27 of the clamp 25 pinch and hold the lower end of the sheath of the armored cable against the ledges 20, and the upper legs 26 force the sheath against the internal edge of the opening 11 in the body portion of the outlet box. Thus an extremely simple and efficient means is provided for securing and maintaining the armored cable in proper relation to the outlet box.

Such changes in details of construction and arrangement of parts as would occur to one skilled in the art are to be considered as coming within the spirit of the invention as set forth in the appended claims.

I claim:

1. An outlet box comprising a body portion, portions formed in continuity with and hinged to said body portion so as to be capable of swinging outwardly from said body portion, interengaging openings in said body portion and said hinged portions, armored cables entering said outlet box through said interengaging openings, clamping means secured to said body portion beneath said opening, comprising a platform forming part of said clamping means, apertures in said platform in alinement with said openings, channel-shaped clamping means secured to said hinged portions, said clamping means on said body portion co-operating with said clamping means on said hinged portions so as to firmly position and secure the armored cables in said outlet box, the ends of the sheaths of said armored cables resting on said platform and the wires of said armored cables extending through the aperture in said platform.

2. An outlet box comprising a body portion, portions formed in continuity with and hinged to said body portion so as to be capable of swinging outwardly from said body portion, interengaging openings in said body portion and said hinged portions, armored cables entering said outlet box through said interengaging openings, clamping means secured to said body portion beneath said openings, a platform forming part of said clamping means, apertures in said platform in alinement with said openings, the walls forming said apertures being slotted to form openings in the side of said apertures, channel-shaped clamping means secured to said hinged portions, said clamping means on said body portion co-operating with said clamping means on said hinged portions so as to firmly position and secure the armored cables in said outlet box, the ends of the sheaths of said armored cables resting on said platform and the wires of said armored cables being adapted to pass through the openings into the apertures of said platform.

EDWARD KLARFELD.